United States Patent
Hoch et al.

[11] 3,774,046
[45] Nov. 20, 1973

[54] COUNTERFEIT CURRENCY DETECTOR

[76] Inventors: George E. Hoch, 31-28 Eventerry Dr., Oceanside, N.Y. 11572;
Wilbert H. Hirsch, 3099 Monterey Dr., Merrick, N.Y.

[22] Filed: June 5, 1972

[21] Appl. No.: 259,376

[52] U.S. Cl. .............................. 250/485, 250/491
[51] Int. Cl. .............................................. G01d 7/06
[58] Field of Search ..................... 250/71 R, 71 SR, 250/78, 491, 485; 356/71

[56] References Cited
UNITED STATES PATENTS

| | | | |
|---|---|---|---|
| 2,161,594 | 6/1939 | Ruth | 356/71 |
| 2,951,164 | 8/1960 | Timms | 250/71.5 R |
| 2,059,197 | 11/1936 | Backer et al. | 356/71 X |
| 3,467,825 | 9/1969 | Hubert | 250/78 |
| 3,487,210 | 12/1969 | Hubert | 250/78 |

Primary Examiner—James W. Lawrence
Assistant Examiner—Davis L. Willis
Attorney—William T. Hough et al.

[57] ABSTRACT

A detector of counterfeit paper currency as opposed to genuine United States currency of any denomination, which includes a box-like enclosure having a small viewing window, having a port for insertion thereinto of the currency, and having a supporting surface therein in the line of sight of the viewing window positioned such to support currency inserted thereinto with a side thereof facing about the line of sight, with a fluorescent ultra-violet light mounted within the enclosure above the line of sight with a protective baffle blocking direct ultra-violet light from the line of sight and the ultra-violet fluorescent bulb being positioned such that light striking the mounting surface at the location at which the currency to be examined would be viewable passing rays to that point in as nearly parallel relationship as possible relative to the line of sight in order to avoid shadows — i.e., in order to avoid portions of the currency being viewable in the line of sight devoid of reflected ultra-violet light, and similarly to reduce the possibility of shadows from the ultra-violet light, the mounting surface being angled away from the line of sight to an extent preferably such that for a flat mounting surface away from the line of sight beyond the line of light to the mounting point where there is defined between the line of light and the removed flat surface an angle greater than 90°, whereby at all times any shadows cast by the ultra-violet light are cast in a direction away from the line of sight through the viewing window, the ultra-violet light from a fluorescent tube ultra-violet bulb, which bulb has therein a filter as a part thereof, casts a reflected light on the currency mounted on the mounted surface in the line of sight with the result that counterfeit currency has a significantly and substantially greater lightness in shade and reflectiveness than genuine U.S. paper currency.

6 Claims, 2 Drawing Figures

PATENTED NOV 20 1973 3,774,046

COUNTERFEIT CURRENCY DETECTOR

This invention relates to a detector of counterfeit currency as contrasted to genuine U.S. paper currency of any denomination.

BACKGROUND

Prior to the present invention there have existed devices for the detection of counterfeit currency, which devices range in degree of complexity, all of which are requisite of many complicated parts and normally require an operator with considerable skill in order to make proper determinations of the fact of counterfeit currency. Included within the prior art detectors are those which utilize at least partially ultra-violet radiation together with necessary complicating elements. Examples of such prior detectors are disclosed in U.S. Pat. No. 2,951,164, and U.S. Pat. No. 2,950,799 both of Timms, and U.S. Pat. No. 3,618,765 to Cooper. With regard to the latter, there is disclosed a viewing window having ultra-violet light bulbs mounted immediately therebeneath with bulbs and the viewing window being above a flat mounting surface available through a port for the insertion of currency to be examined. This particular Cooper apparatus requires that the reflected ultra-violet light be viewed through a window having a filter therein, the filter of necessity having a light blue color thereby permitting the viewing of the light blue or bluish-white chromamorphic response of counterfeit paper currency under the ultra-violet light from the ultra-violet bulbs.

SUMMARY OF THE INVENTION

An object of the present invention is to simplify the structure and necessary elements for the detection of any denomination of counterfeit currency as compared to genuine U.S. paper currency.

Another object is to obtain a detector of counterfeit money not requiring special viewing filters.

Another object is to obtain a detector for viewing and detecting counterfeit paper currency in which the eyes of the viewing person are securely protected against the hazards of the blinding ultra-violet radiation.

Another object is to obtain a paper currency counterfeit detector of simple construction and low cost of production.

Another object is to obtain a detector of paper counterfeit currency which is of improved reliability and fool-proof detection of counterfeit currency.

Another object is to obtain a detector of paper counterfeit currency overcoming one or more of the problems of the type discussed above.

Another object is to obtain a paper counterfeit currency detector successfully operable by an amateur.

Another object is to obtain a detector of paper counterfeit currency providing for easy insertion and withdrawal for high speed determinations by either left-handed or right-handed persons.

Other objects become apparent from the preceding and following disclosure.

One or more of the preceding objects are obtained by the invention as defined herein.

Broadly the invention includes a structure defining a substantially complete enclosure except for a small viewing window and an insertion port for the insertion therethrough of currency bills of various paper denominations to be examined, and there being a supporting surface within the enclosure for supporting the currency in a position such that a side face of the currency is readily viewable through the viewing window, there being within the enclosure a fluorescent ultra-violet light having a built-in filter and a barrier for obstructing light therefrom from the line of sight through the viewing window and positioned such that ultra-violet light traveling to the mounting surface for currency to be examined is as nearly parallel as possible to the line of sight through the viewing window in order to reduce the possibility of shadows produced by microscopic projections above the surface of the currency being examined, such shadows being the result of the ultra-violet light, as compared to the angle of the line of sight not striking areas viewable in the line of sight. In order to further reduce the possibility of such areas away from the ultra-violet light not receiving ultra-violet light, the mounting surface is in a preferred embodiment angled away from the line of sight at least to and possibly past a perpendicular to the line of approaching ultra-violet light from the fluorescent ultra-violet bulb such that the probability of any shadows resulting from obstructions in the line of the ultra-violet light are not viewable in the line of sight through the viewing window. The barrier obstructing ultra-violet radiation from the line of sight through the viewing window avoids the possibility of injury to the retina of the eye of a viewing person. The closer the source of the ultra-violet light to the currency being examined, the better the contrast between counterfeit currency and genuine currency. In a preferred embodiment, a genuine currency bill such as a dollar bill is mounted within the enclosure on the mounting surface for comparison with counterfeit currency, the counterfeit currency having a much lighter shade and greater reflectiveness than genuine currency. As a matter of further meeting one or more of the objects of the present invention, the enclosure is preferably shaped in a substantially rectangular cuboid shape with the viewing window being located such that the line of sight angles downwardly at about a 45° angle, but this angle being variable by having adjustable legs on the front base of the enclosing structure. Also, preferably for speed of use of the detector and convenience as well, the port for the insertion of the currency to be examined extends preferably in a slit receivable of a hand easily and the slit extending along a front base of the rectangular cuboid box, and preferably also extending backwardly along the side and angled upwardly along the slanted mounting base. Within the enclosure, preferably all surfaces include a blackened coating of some sort or another, or at least a dark-shaded coating, to reduce the reflectiveness of white light from outside of the box through the port and/or through the viewing window. The invention will be better understood by reference to the following figures.

THE FIGURES

DETAILED DESCRIPTION OF THE INVENTION

Figure 1:
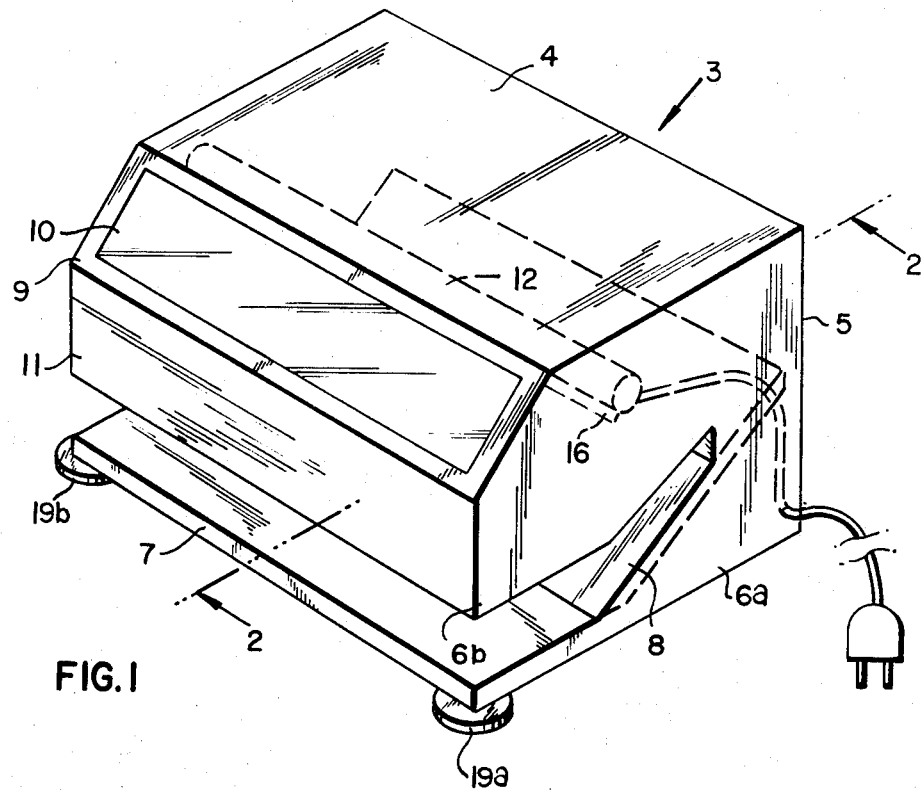
FIG. 1 illustrates a perspective view of a typical and preferred embodiment of the detector of this invention.

In greater detail, FIG. 1 illustrates a detector 3 having a top 4, a back 5, and end surface portions 6a, and 6b. The box includes a slot 7, which extends along the sides and upwardly angled as slot 8. In this preferred embodiment there is the angled surface 9 having a viewing window 10 therein and the box front surface 11 above the slot 7. Shown in phantom as located within the enclosure is an ultra-violet light 12 and a baffle 16 preventing light from reaching the line of sight through the viewing window 10. Also viewable are the front adjustable-height legs 19a and 19b.

Figure 2:
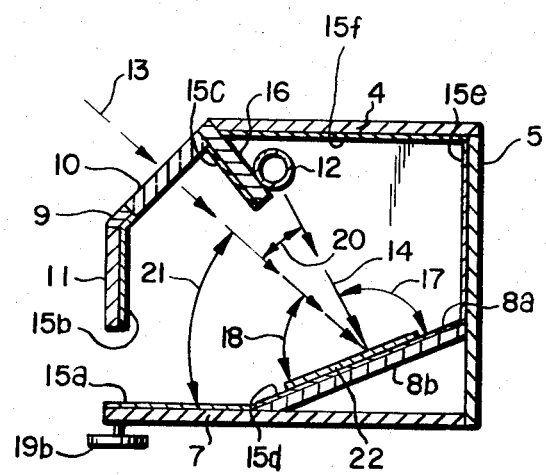
FIG. 2 illustrates a view of the embodiment of FIG. 1 as taken along line 2—2 of FIG. 1, illustrated in cross-sectional view.

FIG. 2 illustrates the same elements as noted above and additionally illustrates the line of sight 13, the linear line of travel of ultra-violet light 14 to the currency 22 being examined under the line of sight 13. Substantially all surfaces within the enclosure include the non-reflective lining 15a, 15b, 15c, 15d, 15e, and 15f. The angle 17 between the linear line of travel of the ultra-violet light and the surface 8a of the mounting structure 8b preferably is at least 90° and more preferably exceeds 90°, angle 18 ranging in a preferred embodiment from about 35° to about 60°. Accordingly, the angle 18 is less than 90°. Also, accordingly angle 20, defining the angle between the line of sight and the line of travel of the ultra-violet light before their intersection at the currency being examined is as minimal as possible, ranging from about 10° to about 55°, in order to reduce the possibility and probability of shadows cast by the ultra-violet light being viewable by the viewer in the line of sight 13.

It is within the scope of the invention to make such variations, modifications, and substitutions of equivalents as would be apparent to a person of ordinary skill in this particular field.

We claim:

1. A device for facilitating detection of counterfeit currency comprising, in combination: a structure defining substantially a total enclosure and defining a small window for viewing downwardly into the enclosure, and substantially out of the line of sight when viewing downwardly through said window a port for insertion into and withdrawal therefrom of currency to be viewed; a mounting element having a supporting surface supportable of currency in a position such that a side face of the currency is substantially facing said viewing window and accordingly in the line of sight therethrough; an ultra-violet fluorescent tube light mounted in a position adjacent said window above the line of sight through the window such that the line of sight and light from said ultra-violet fluorescent bulb move to the point at which said line of sight intersects with said mounting surface along a linear plane defining an acute first angle relative to the line of sight of a predetermined minimal number of degrees such that shadows of currency-roughened surface are substantially avoided, and the line of light defining a second angle in juxtaposition to the acute angle, extending away from the acute angle and to the supporting surface, in which the second angle is greater than 90° and ranges up to 110°; a baffle mounted between said viewing window and said bulb in a position such that ultra-violet light from said bulb is not directly viewable through said viewing window, said mounting surface being substantially flat and said viewing window being positioned such that said line of sight extends about obliquely downwardly to define a third angle relative to said surface of about 35° to 60°, said acute angle being defined between said third and second angles and ranging from about 10° to about 55°.

2. The device for facilitating detection of claim 1, including means for elevating and lowering a front portion of said structure such that the angle of said line of sight to a horizontal may be raised and lowered adjustably.

3. The device for facilitating detection of claim 2, in which said defined enclosure is shaped as an oblong generally rectangular box having said port as a slit along a front base of the rectangular enclosure, the slit being substantially below the viewing window.

4. The device for facilitating detection of claim 3, in which said rectangularly shaped enclosure is substantially cuboid in shape and in which said slit extends about horizontally backwardly along each side and slightly angled upwardly within each side thereby facilitatable of hand insertion of currency to be examined by insertion from either side or from the front.

5. A device for facilitating detection of claim 1, in which said defined enclosure is shaped as an oblong generally rectangular box having said port as a slit along a front base of the rectangular enclosure, the slit being substantially below the viewing window.

6. A device for facilitating detection of claim 5, in which said rectangularly shaped enclosure is substantially cuboid in shape and in which said slit extends about horizontally backwardly along each side and slightly angled upwardly within each side thereby facilitatable of hand insertion of currency to be examined by insertion from either side or from the front.

* * * * *